UNITED STATES PATENT OFFICE.

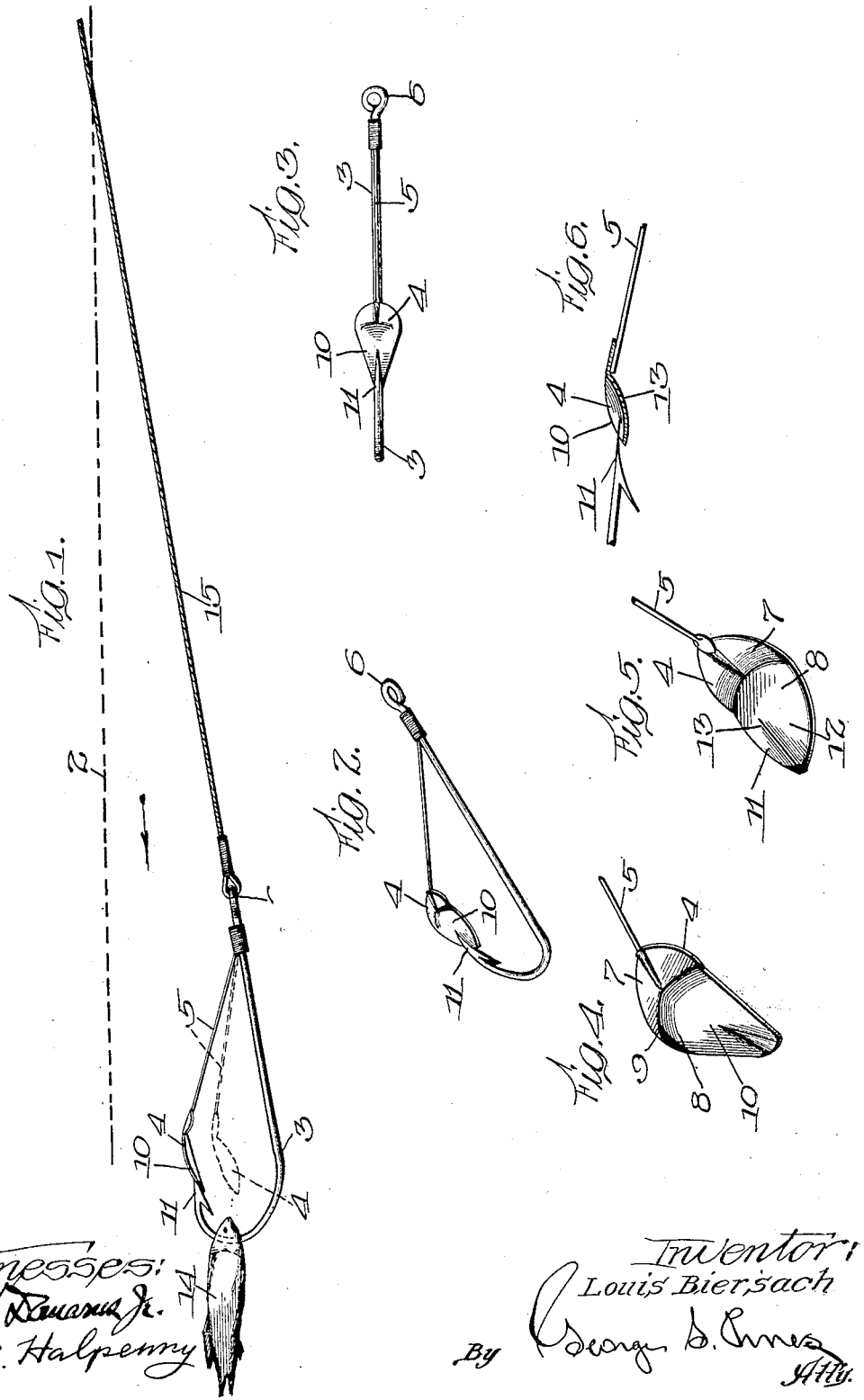

LOUIS BIERSACH, OF FREEPORT, ILLINOIS.

FISH-HOOK.

No. 875,684.    Specification of Letters Patent.    Patented Jan. 7, 1908.

Application filed September 5, 1907. Serial No. 391,442.

*To all whom it may concern:*

Be it known that I, LOUIS BIERSACH, a citizen of the United States, residing at Freeport, in the county of Stephenson and State of Illinois, have invented certain new and useful Improvements in Fish-Hooks, of which the following is a specification.

My invention relates to fishing tackle and has particular reference to improvements in fish hooks.

The object of the invention is to provide a new and improved guard for the point of the hook and to constitute said guard a means for supporting the hook and a bait thereon in a proper position.

With the above-named object in view my invention consists in the novel construction, combination and arrangement of parts hereinafter described in detail, illustrated in the drawing and incorporated in the appended claims.

In the drawing—Figure 1 is a side elevation of my improved hook with line and live bait attached thereto. Fig. 2 is a perspective view of the hook. Fig. 3 is a top plan view of same. Fig. 4 is an enlarged perspective view of the combination guard and guide, showing the upper surface of same. Fig. 5 shows the opposite side of the guard and guide in perspective. Fig. 6 is a vertical section through the guard and guide together with fragments of associated parts.

Referring in detail to the several views, 2 represents a running stream, the direction of the current being indicated by an arrow. It is obvious, of course, that if the hook is used in still waters the action of the angler on the hook is the equivalent of the current in the stream.

3 is an ordinary hook provided with my improved guard and guide 4 secured to the free end of a spring arm or stem 5 which extends from a point near the eye 6 of the hook. My improved combination guard and guide consists of a thin plate of metal having a flat portion 7 and a concave portion 8. The portion 7 is alined with the stem 5, while the portion 8 is bent at an angle, along the line 9, relative to the portion 7. The part 8 is concaved so that its upper surface forms a trough or depression 10 adapted to receive the point 11 of the hook, and so that its under surface forms a water-cutting wedge consisting of inclined sides 11 and 12 and a ridge or apex 13.

With the aid of my invention the forces of gravity and the running stream impinged against the under surfaces of the guard and guide 4 will not only hold the bait, such as a minnow 14, in its natural position, but will also prevent the rotation of the hook and twisting of the line 15 in the following manner: The force of the stream will act against the comparatively expansive surfaces of the guard and guide 4. If the hook is dropped into the water with the concavity 10 upstream, the force of the stream will act against the guard and guide and tend to raise the lower end of the hook or place the hook in a horizontal or proper position. The greater weight, or the body of the hook, being on the convexed or ridged side of the guard and guide, the hook will obviously right itself to the position in which it is shown in Figs. 1 and 2, where the ridge 13 cuts the stream like the prow of a boat and the inclination of the sides 11 and 12 relative to the direction of the flow of the stream maintains a continuous lifting force in opposition to the force of gravity on the hook, it being understood that the arm 5 is, as has been the custom heretofore, made of very thin or light spring wire.

As a guard for the point of the hook my invention has the following advantages over the numerous devices heretofore provided for that purpose. The comparatively deep depression 10 together with the broad expanse of the guard prevents a very near approach of weeds to the point of the hook. The flat surface 7, with the rounded edges as shown, acts as a sled with wide runners, when the hook is dragging on the bed of the stream, which may smoothly pass over rubbish instead of offering sharp corners or angles which may cause the guard itself to catch weeds, open the guard and obstruct the point of the hook. Furthermore, the construction and arrangement of the guard causes the stream to close the guard against the point of the hook if the spring 5 happens to be weak.

I claim as my invention—

1. The combination with a fish hook, of a guard and guide consisting of the rudder-like plate of metal which has a concavity adapted to receive the point of the hook and a convex surface which is adapted to coöperate with the current of a body of water in supporting the hook in an upright position.

2. The combination with a fish hook of a combination weed and snag guard and rudder one side of which has a depression for the point of the hook while the opposite side is convexed as set forth, so that it coöperates with a current in controlling the position of the hook.

3. The combination with a fish hook having a spring arm 5 of a combination guard and guide, said guard and guide constructed and arranged with a concavity on one side which guards the point of the hook and a convexed surface on the opposite side which coöperates with the current and the force of gravity on the hook to hold the latter in a proper or upright position.

4. The combination with a fish hook having an arm 5, of a guard and guide on the free end of said arm, said guard and guide consisting of a flat piece of metal having a concavo-convex portion 8 and the flat part 7 arranged at an angle to the part 8, as and for the purpose set forth.

In testimony whereof, I have hereunto set my hand in the presence of two subscribing witnesses.

LOUIS BIERSACH.

Witnesses:
ALICE SEACHRIST,
L. M. CURRIER.